(12) United States Patent
Wu

(10) Patent No.: US 12,284,275 B2
(45) Date of Patent: Apr. 22, 2025

(54) METHOD FOR SECURELY GENERATING AND DISTRIBUTING SYMMETRIC KEYS FOR GROUPING SECURE COMMUNICATIONS

(71) Applicant: Fort Robotics, Inc., Philadelphia, PA (US)

(72) Inventor: Guang Wu, Philadelphia, PA (US)

(73) Assignee: Fort Robotics, Inc., Philadelphia, PA (US)

( * ) Notice: Subject to any disclaimer, the term of this patent is extended or adjusted under 35 U.S.C. 154(b) by 0 days.

(21) Appl. No.: 18/373,152

(22) Filed: Sep. 26, 2023

(65) Prior Publication Data

US 2024/0106638 A1 Mar. 28, 2024

Related U.S. Application Data

(60) Provisional application No. 63/419,968, filed on Oct. 27, 2022, provisional application No. 63/410,582, filed on Sep. 27, 2022.

(51) Int. Cl.
*H04L 9/08* (2006.01)

(52) U.S. Cl.
CPC .......... *H04L 9/0869* (2013.01); *H04L 9/0877* (2013.01); *H04L 9/0894* (2013.01)

(58) Field of Classification Search
CPC .... H04L 9/0869; H04L 9/0877; H04L 9/0894
USPC ....................................................... 713/171
See application file for complete search history.

(56) References Cited

U.S. PATENT DOCUMENTS

| | | | | |
|---|---|---|---|---|
| 8,566,247 | B1* | 10/2013 | Nagel | H04L 63/045 380/270 |
| 11,323,254 | B2* | 5/2022 | Levin | H04L 9/0656 |
| 2008/0152148 | A1* | 6/2008 | Sudhakar | H04L 9/083 380/46 |
| 2009/0046853 | A1* | 2/2009 | Hui | H04L 9/14 380/44 |
| 2017/0251036 | A1* | 8/2017 | Yamaoka | H04L 65/1063 |

OTHER PUBLICATIONS

"Velumadhava" "A Secure Key Transfer Protocol for Group Communication", "2012" "Advanced Computing: An International Journal ( ACIJ )" "vol. 3" "p. 83-90" (Year: 2012).*

(Continued)

*Primary Examiner* — Moeen Khan
(74) *Attorney, Agent, or Firm* — Run8 Patent Group, LLC; Peter Miller; Brian T. Chew

(57) ABSTRACT

A method includes, by a key server: identifying a group of devices; accessing secret values pre-provisioned to devices in the group of devices; accessing prime numbers pre-provisioned to devices in the group of devices; generating a cryptographic key for communication among the group of devices; generating a message based on the secret values, the prime numbers, and the cryptographic key; and transmitting the message to a device in the group of devices. The method also includes, by a first device in the group of devices: in response to receiving the message, deriving the cryptographic key from the message based on a first secret value, pre-provisioned to the first device, and a first prime number pre-provisioned to the first device; and associating the cryptographic key with communication among the group of devices.

20 Claims, 3 Drawing Sheets

(56) References Cited

OTHER PUBLICATIONS

Harn et al, "Authenticated Group Key Transfer Protocol Based on Secret Sharing", IEEE Transactions on Computers, vol. 59, No. 6, Jun. 2010.
Rao et al, "A Secure Key Transfer Protocol for Group Communication", Advanced Computing: An International Journal ( ACIJ ), vol. 3, No. 6, Nov. 2012.
International Search Report received in PCT/US2023/033737 dated Dec. 20, 2023.

* cited by examiner

METHOD FOR SECURELY GENERATING AND DISTRIBUTING SYMMETRIC KEYS FOR GROUPING SECURE COMMUNICATIONS

CROSS-REFERENCE TO RELATED APPLICATIONS

This Application claims the benefit of U.S. Provisional Application No. 63/410,582, filed on 27 Sep. 2022, and U.S. Provisional Application No. 63/419,968, filed on 27 Oct. 2022, each of which is incorporated in its entirety by this reference.

TECHNICAL FIELD

This invention relates generally to the field of communications security and more specifically to a new and useful method for securely generating and distributing symmetric keys for grouping secure communications within the field of communications security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1A:
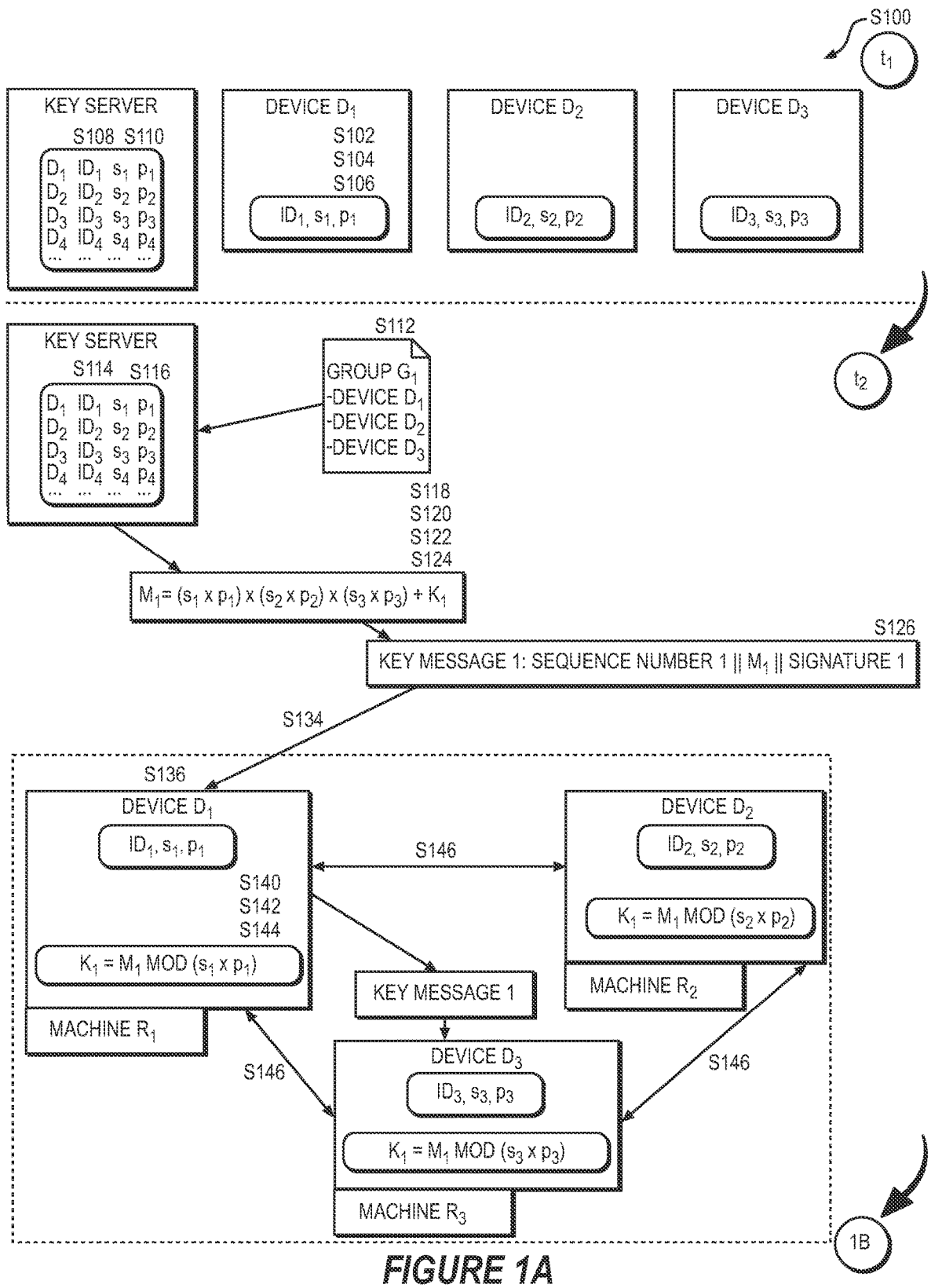
FIGS. 1A and 1B are flowchart representations of a method.
Figure 2A:
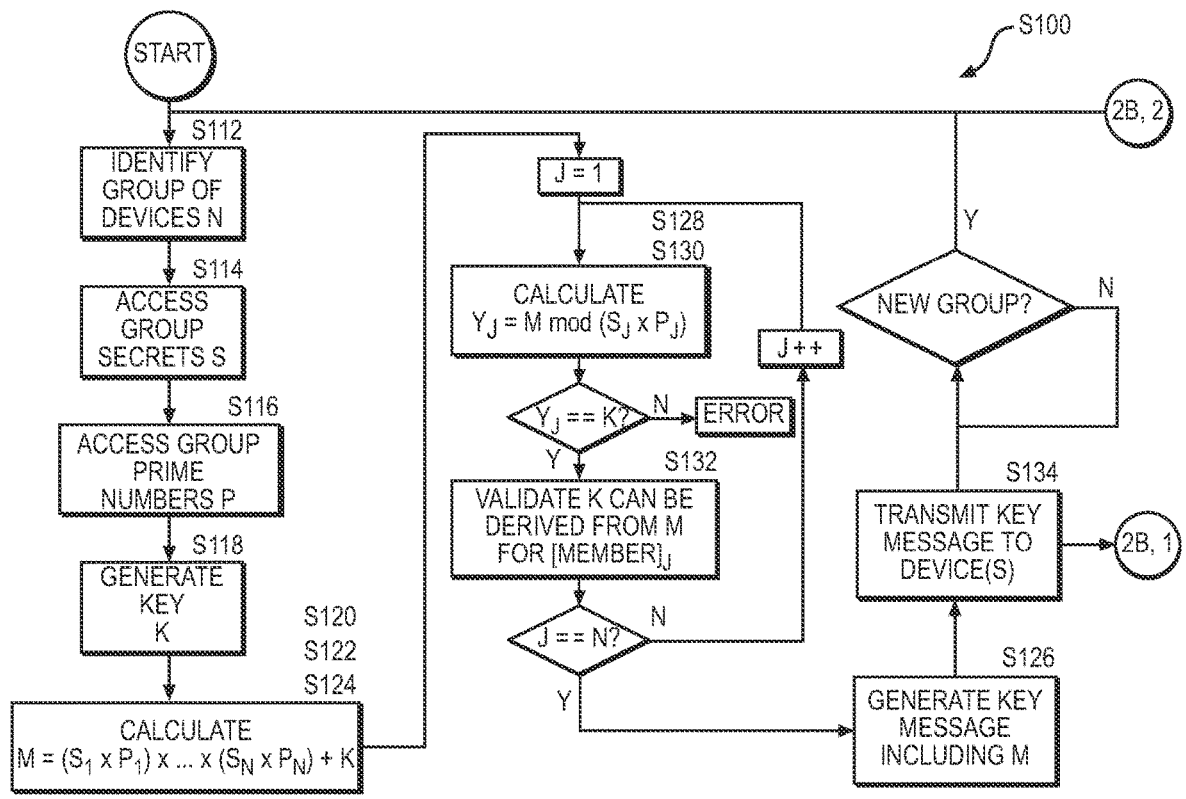
FIGS. 2A and 2B are flowchart representations of one variation of the method.
Figure 2B:
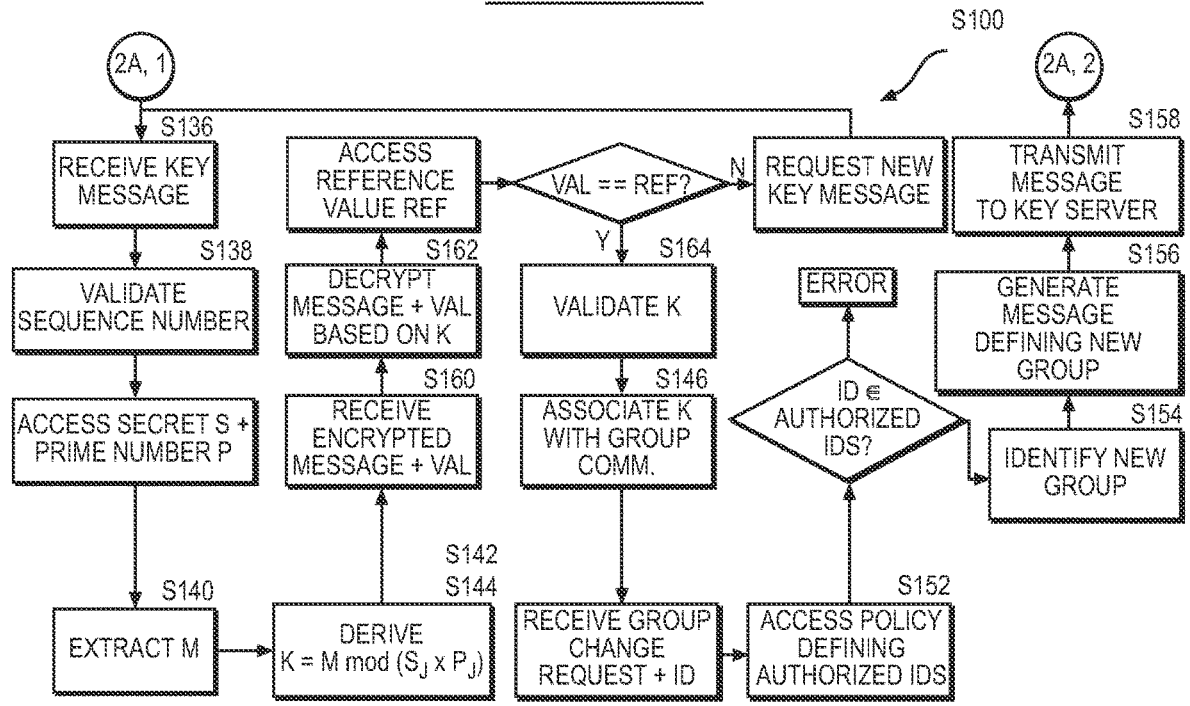

As shown in FIGS. 1A, 2A, and 2B, a method S100 includes, by a first device in a population of devices, during a first time period: storing a first secret value assigned to the first device in Block S102; and storing a first prime number assigned to the first device in Block S104.

The method S100 also includes, by a key server during the first time period: storing a population of secret values assigned to devices in the population of devices in Block S108, the population of secret values including the first secret value; and storing a population of prime numbers assigned to devices in the population of devices in Block S110, the population of prime numbers including the first prime number.

The method S100 further includes, by the key server during a second time period succeeding the first time period: identifying a first group of devices, in the population of devices, including the first device in Block S112; accessing a first set of secret values, in the population of secret values, assigned to devices in the first group of devices in Block S114, the first set of secret values including the first secret value; accessing a first set of prime numbers, in the population of prime numbers, assigned to devices in the first group of devices in Block S116, the first set of prime numbers including the first prime number; generating a first cryptographic key for communication among the group of devices in Block S118; generating a first message based on the set of secret values, the set of prime numbers, and the cryptographic key in Block S126; and transmitting the message to a device in the group of devices in Block S134.

The method S100 also includes, during a second time period succeeding the first time period: receiving a first message in Block S136, the first message—including a first value—representing a first cryptographic key for communication among a first group of devices, in the population of devices, including the first device; extracting the first value from the first message in Block S140; calculating a second value corresponding to a product of the first secret value and the first prime number in Block S142; deriving the first cryptographic key corresponding to a remainder of the first value divided by the second value in Block S144; and associating the first cryptographic key with communication among the first group of devices in Block S146.

1.1 Variation: Key Server

As shown in FIGS. 1A and 2A, one variation of the method S100 includes, by a key server during a first time period: storing a population of secret values assigned to devices in a population of devices including a first device in Block S108, the population of secret values including a first secret value assigned to the first device; and storing a population of prime numbers assigned to devices in the population of devices in Block S110, the population of prime numbers including a first prime number assigned to the first device.

This variation of the method S100 also includes, during a second time period succeeding the first time period: identifying a first group of devices, in the population of devices, including the first device in Block S112; accessing a first set of secret values, including the first secret value, assigned to devices in the first group of devices in Block S114; accessing a first set of prime numbers, including the first prime number, assigned to devices in the first group of devices in Block S116; and generating a first cryptographic key for communication among the first group of devices in Block S118.

This variation of the method S100 further includes: for each device in the first group of devices, calculating a device value, in a set of device values, corresponding to a product of a secret value, in the set of secret values, assigned to the device and a prime number, in the set of prime numbers, assigned to the device in Block S120; calculating a group value corresponding to a product of the set of device values in Block S122; calculating a first value corresponding to a sum of the group value and the first cryptographic key in Block S124; generating a first message including the first value in Block S126; and transmitting the first message to a device in the first group of devices in Block S134.

1.2 Variation: Key Server & Group Device

As shown in FIGS. 1A, 2A, and 2B, one variation of the method S100 includes, by a first device in the population of devices during a first time period: storing a first secret value assigned to the first device in Block S102; and storing a first prime number assigned to the first device in Block 104.

This variation of the method S100 also includes, by a key server during the first time period: storing a population of secret values assigned to devices in a population of devices including a first device in Block S108, the population of secret values including the first secret value; and storing a population of prime numbers assigned to devices in the population of devices in Block S110, the population of prime numbers including the first prime number.

This variation of the method S1000 further includes, by the key server during a second time period succeeding the first time period: identifying a group of devices, in the population of devices, including the first device in Block S112; accessing a set of secret values, including the first secret value, assigned to devices in the group of devices in Block S114; accessing a set of prime numbers, including the first prime number, assigned to devices in the group of devices in Block S116; generating a cryptographic key for communication among the group of devices in Block S118; generating a message based on the set of secret values, the set of prime numbers, and the cryptographic key in Block S126; and transmitting the message to a second device in the group of devices in Block S134.

This variation of the method S100 also includes, by the first device during the second time period: in response to receiving the message from the second device, deriving the cryptographic key from the message based on the first secret value and the first prime number in Block S144; and associating the cryptographic key with communication among the group of devices in Block S146.

2. Applications

Generally, a key server (e.g., a computing device) and a group of devices can execute Blocks of the method S100: to identify a group of devices—in a population of devices—for which to generate a group symmetric key; to generate a key message representing the group symmetric key; to propagate the key message to the group of devices; to derive the group symmetric key from the key message; and to associate the group symmetric key with secure communication among the group of devices.

More specifically, the key server can execute Blocks of the method S100: to identify the group of devices; to generate a group symmetric key for the group of devices; to generate a key message based on a set of secret keys assigned to the group of devices, a set of prime numbers associated with the group of devices, and the group symmetric key; and to distribute the key message to the group of devices. Accordingly, the key server can embed a group symmetric key in a key message such that the group symmetric key can only be extracted by devices in the group of devices, thereby preventing retrieval of the group symmetric key by unauthorized participants.

Furthermore, each device—in the group of devices—can execute Blocks of the method S100: to receive the key message; to derive the group symmetric key based on a secret key and a prime number stored (e.g., pre-provisioned) in the device; and to associate the group symmetric key with secure communication among the group of devices. Accordingly, each of these devices can extract the group symmetric key from the key message based on pre-provisioned information (e.g., a secret key, a prime number) in the device, thereby reducing communication overhead while grouping secure communications during operation in an operating field.

2.2 Examples

In one example application, a group of devices can execute Blocks of the method S100 to pass a key message—generated by a key server—from a first device, in the group of devices, to a second device in the group of devices, the second device absent a direct communication link to the key server (e.g., the second device mounted on a machine that is deployed in a work zone lacking Internet connectivity). The first device and the second device can then: derive a group symmetric key from the key message; and associate the group symmetric key with secure communication among the group of devices. Accordingly, these devices can retrieve a group symmetric key and establish secure group communications among a group of devices even in an absence of direct communication with the key server for each device in the group of devices.

In another example application, the key server can execute Blocks of the method S100, in response to a change in the group of devices (e.g., an addition of a device in the group of devices, a removal of a device from the group of devices): to generate a new group symmetric key; and to propagate a new key message representing the new group key. Therefore the key server can: ensure forward secrecy such that a device that is removed from the group of devices may not access the new group key; and ensure backward secrecy such that a device that is added to the group at a later time may not access prior secure group communication.

2.2 Variation: Bit Length

As described herein, a key server and a group of devices execute Blocks of the method S100: to generate a key message representing a 128-bit group symmetric key and to derive the group symmetric key from the key message based on 128-bit secret keys and 128-bit prime numbers. However, a key server and a group of devices can similarly execute Blocks of the method S100: to generate a key message representing a group symmetric key exhibiting a longer bit length (e.g., 256-bit) or a shorter bit length (e.g., 64-bit); and to derive the group symmetric key from the key message based on secret keys and prime numbers exhibiting longer bit lengths (e.g., 256-bit) or shorter bit lengths (e.g., 64-bit).

3. Terminology

Generally, a "key server" is referred to herein as a computer that serves cryptographic keys (e.g., a public key, a symmetric key) to devices.

Generally, a "device" is referred to herein as a computer that executes communications, security, and/or safety functionality on behalf of a machine.

Generally, a "machine" is referred to herein as an entity (e.g., autonomous machine, robot, vehicle)—on which a device is mounted—deployed to an operating field to execute a task.

Generally, an "asymmetric key pair" is referred to herein as a pair of cryptographic keys—associated with one device—including a public key and a private key.

Generally, a "group symmetric key" is referred to herein as a cryptographic key based on which a group of devices encrypt, decrypt, and/or authenticate a message among the group of devices.

Generally, a "secret key" is referred to herein as a value associated with a particular device in a population of devices and exclusively known by the particular device and a key server.

4. System

Generally, as shown in FIG. 1A, a system can include: a population of devices (e.g., safety devices, security devices, communication modules); and a population of machines (e.g., vehicles, robots). Each device—in the population of devices—can be: communicatively coupled to another device, in the population of devices, via a communication network (e.g., local area network, wide area network, the Internet); and/or mounted on a machine in the population of devices.

In one implementation, the system can include a group of machines in the population of machines, such as a group of machines operating in an operating field including a set of work zones. In this implementation, the system can further include a group of devices corresponding to the group of machines. In particular, the system can include the group of devices, each device, in the group of devices, corresponding to a machine—in the group of machines—on which the device is mounted.

4.1 Machine Architecture

Generally, a machine can include a sensor (e.g., radar sensor, LiDAR sensor, ultrasonic sensor, infrared camera), a robot, a vehicle (e.g., autonomous vehicle, semi-autonomous vehicle), a control system, an emergency stop system (e.g., line break sensor, emergency stop button) and/or an industrial system (e.g., manufacturing system, farming system, construction system, power system, transportation system), etc.

In one implementation, a machine can include a set of resources, such as a set of processors, volatile memory (e.g., random access memory or "RAM"), non-volatile memory (e.g., flash storage), an input/output interface, a set of network interfaces (e.g., wireless local area network interface, wired local area network interface, Bluetooth network interface), input devices (e.g., sensors, user interface), output devices (e.g., motor, actuator, hydraulic arm), etc.

4.2 Device Architecture

Generally, a device can include a set of resources, such as a set of controllers, volatile memory (e.g., RAM), non-volatile memory (e.g., flash storage), a set of network interfaces (e.g., wireless local area network interface, wired local area network interface, Bluetooth network interface), input/output interfaces, and/or a hardware security module. Additionally, the device can further include: firmware, an operating system (or kernel), a set of applications, and/or logic.

In one implementation, the device can include the set of resources including: a first controller (e.g., first safety controller); a second controller (e.g., second safety controller); a third controller (e.g., security controller); and a communication bus. The communication bus can support two-way communication between the first controller and the second controller, two-way communication between the first controller and the third controller, and two-way communication between the second controller and the third controller.

In one implementation, the first controller can include: an arithmetic logic unit (hereinafter "ALU"); volatile memory (e.g., RAM); and non-volatile memory (e.g., flash storage). The ALU can execute arithmetic and logic operations based on computer instructions executed by the first controller. The RAM can temporarily store data retrieved from storage for performing calculations. The flash storage can store data and/or instructions that are programmed into the first controller. The first controller can further include an input/output interface, an internal bus, and/or an internal oscillator. The first controller can include fewer or additional components.

The second controller can include analogous (e.g., similar, identical) components as the first controller. For example, the first controller and the second controller can be redundant controllers, each including identical components.

Furthermore, the third controller can include analogous (e.g., similar, identical) components as the first controller. The third controller can further include a network interface (or a set of network interfaces) for communication over the communication network.

5. Secure Communications

Generally, the group of devices can engage in secure communication based on a key distributed among devices in the group of devices. More specifically, the system can further include a key server that can securely distribute a cryptographic key (e.g., public key, symmetric key) to the group of devices. Each device in the group of devices can then securely communicate with other devices, in the group of devices, based on this cryptographic key. For example, each device, in the group of devices, can communicate—with other devices in the group of devices—information associated with a respective machine on which the device is mounted, such as machine status information, access rights, task information, etc.

5.1 Asymmetric Keys

In one implementation, a group of devices can securely communicate based on asymmetric key pairs (e.g., public key infrastructure). In this implementation, each device can exchange a public key with a key server, such as through a wireless communication network (e.g., Internet, intranet). For example, a first device in the group of devices can: transmit—to the key server—a first public key corresponding to the first device; and receive a set of public keys from the key server, each public key—in the set of public keys—corresponding to a device in the group of devices. The first device can securely communicate with the group of devices based on a first private key, corresponding to the first device, and the set of public keys. In this example, the first device can: encrypt a message, to a second device in the group of devices, based on a second public key—in the set of public keys—corresponding to the second device; and decrypt a message, from the second device, based on the first private key.

5.2 Symmetric Key

Additionally or alternatively, a group of devices can securely communicate based on a symmetric key (e.g., group symmetric key). More specifically, a key server can: identify a group of devices, each device—in the group of devices—assigned a secret value; access a set of secret values corresponding to the group of devices; generate a group symmetric key for the group of devices; and generate a key message based on the group symmetric key and the set of secret values. Each device in the group of devices can then: receive the key message; derive the group symmetric key from the key message based on the respective secret value; and associate the group symmetric key with communication among the group of devices.

5.3 Group Leader

Generally, the population of devices can include a device characterized as a "leader device."

In one implementation, a group of devices can include a leader device representing the group of devices. For example, a leader device can: receive the key message from the key server via a first communication link characterized by a first network type (e.g., a long-term evolution (LTE) communication link); and pass the key message to other devices in the group of devices via a second communication link characterized by a second network type (e.g., an industrial, scientific, and medical (ISM) communication link).

In another implementation, a leader device can represent a work zone in a set of work zones in an operating field. More specifically, the leader device can: represent a group of devices within the work zone; identify a second device requesting to join the group of devices within the work zone (e.g., a second device entering the work zone); and/or identify a third device requesting to separate (or "disjoin") from the group of devices within the work zone (e.g., a third device exiting the work zone), as described below.

Accordingly, this group of devices within the work zone may securely communicate with each other to share machine status information, access rights, task information, safety state information, etc.

6. Provisioning Device Information

Blocks of the method S100 recite: storing a first secret value assigned to the first device in Block S102; and storing a first prime number assigned to the first device in Block S104.

Generally, a device may be assigned: an identifier—in a population of identifiers—uniquely identifying the device in a population of devices; a secret value (e.g., a unique 128-bit secret value) in a population of secret values assigned to devices in the population of devices; and a prime number (e.g., a unique 128-bit prime number) in a population of prime numbers assigned to devices in the population of devices.

In one implementation, a first device—in the population of devices—can: store a first secret value assigned to the first device in Block S102; and store a first prime number assigned to the first device in Block S104. For example, the first device can store the first prime number key assigned to the first device, the first prime number exceeding the first secret value.

Additionally, in Block S106, the first device can store a first identifier (e.g., a serial number, a secure machine identifier) assigned to the first device.

Each device in the population of devices can execute this process to store: a secret value; a prime number assigned to the device; and an identifier assigned to the device, such as in a hardware security module in the device. For example, a second device can: store a second secret value—assigned to the second device—that is different from the first secret value; store a second secret value, assigned to the second device, that is different from the first prime number; and store a second identifier, assigned to the second device, that is different from the first identifier.

In another implementation, a device can be provisioned with (or store) a secret value, a prime number, and/or a unique identifier during a time period (e.g., a provisioning period) prior to mounting on a machine. Additionally or alternatively, a device—that is mounted on a machine—can be provisioned with (or store) a secret value, a prime number, and/or a unique identifier during a time period prior to deployment of the machine to an operating field including multiple work zones.

Accordingly, because devices in the population of devices are pre-provisioned (i.e., assigned) with secret values and prime numbers, these devices can bypass a registration step with a key server to exchange secret values to group secure communications during operation in each work zone. Therefore, these devices can derive a group symmetric key from a key message—generated by the key server—based on the pre-provisioned secret values and prime numbers in an absence of direct communication with the key server.

6.1 Server-Side Device Information

Blocks of the method S100 recite: storing a population of secret values—including the first secret value—assigned to devices in the population of devices in Block S108; and storing a population of prime numbers—including the first prime number—assigned to devices in the population of devices in Block S110.

Generally, in Blocks S108 and S110, a key server can store information associated with each device in the population of devices. For example, for each device in the population of devices, the key server can store: a secret value assigned to the device; a prime number assigned to the device; and/or an identifier assigned to the device.

In one implementation, the key server can: store a population of secret values assigned to devices in the population of devices in Block S108; and store a population of prime numbers assigned to devices in the population of devices in Block S110. Additionally, the key server can store a population of identifiers assigned to devices in the population of devices.

For example, the key server can store: a first secret value assigned to a first device in the population of devices; a first prime number assigned to the first device; and a first identifier assigned to the first device. The key server can store, for each device in the population of devices: a secret value assigned to the device; a prime number assigned to the device; and/or an identifier assigned to the device.

In another implementation, the key server can store the information associated with the first device during a time period (e.g., the provisioning period) prior to deployment of the first device to an operating field.

In another implementation, the key server can store the population of secret value and the population of prime numbers in a database within a secure storage unit included in the key server. Additionally or alternatively, the key server can store the population of secret value and the population of prime numbers in a database within a secure external storage unit.

Accordingly, because the key server stores—for each device in the population of devices—a secret value and a prime number pre-provisioned (i.e., assigned) to the device, the key server can bypass the registration step with these devices to exchange secret values to group secure communications during operation in a work zone.

Therefore, the key server and the devices can minimize communication overhead during runtime execution.

6.2.1 Keying Materials

In one variation, in Block S108, the key server can store a population of keying material values corresponding to devices in the population of devices. For example, the key server can store a first keying material value corresponding to the first device, the first keying material value exhibiting a first data size falling below a second data size exhibited by the first secret value assigned to the first device.

In this variation, in Block S114, the key server can: access the first keying material value corresponding to the first device; and generate (or derive) the first secret value—assigned to the first device—based on the first keying material value and a predefined function (e.g., a deterministic function, AES-128, HMAC). More specifically, the key server can generate the first secret value by inputting the first keying material value into the predefined function.

The key server can repeat this process for each device in a set (e.g., a group) of devices to generate a secret value—assigned to the device—based on a keying material value corresponding to the device and the predefined function.

Accordingly, by storing a keying material value—based on which a secret value may be derived—exhibiting a data size falling below that of the secret value, the key server can reduce an allocated amount of data storage for accessing a population of secret values.

7. Group Symmetric Key Transfer

Blocks of the method S100 recite: identifying the first group of devices including the first device in Block S112; accessing a first set of secret values, in the population of secret values, assigned to devices in the first group of devices in Block S114, the first set of secret values including the first secret value; accessing a first set of prime numbers, in the population of prime numbers, assigned to devices in the first group of devices in Block S116, the first set of prime numbers including the first prime number; generating the first cryptographic key in Block S118; and generating the first message based on the first set of secret values, the first set of prime numbers, and the first cryptographic key in Block S126.

Generally, as shown in FIG. 2A, the key server can: identify a group of devices for which to generate a group symmetric key; generate the key message—including the group symmetric key—based on the group of devices; and propagate the key message to the group of devices.

7.1 Group Identification

Generally, in Block S112, the key server can identify a group of devices in the population of devices. More specifically, the key server can identify a group of devices for which to generate a group symmetric key.

In one implementation, the key server can receive a message from a device, the message representing a request to join (or separate from) a first group of devices. In this implementation, the key server can identify a second group of devices based on the message.

In one example, the key server: receives a first message, from a first device, representing a request to join a first group of devices; and identifies a second group of devices—based on the first message—including the first group of devices and the first device.

In this example, the key server also: receives the first message including a first identifier assigned to the first device; and accesses a policy defining a set of authorized identifiers (e.g., a set of authorized identifiers for the first group of devices and/or the second group of devices). In response to the set of authorized identifiers including the first identifier, the key server identifies the second group of devices including the first device. Alternatively, in response to the set of authorized identifiers excluding the first identifier, the key server can discard the first message and/or return an error message to the first device.

In another example, the key server: receives a second message, from the first device, representing a request to separate from the second group of devices; and identifies a third group of devices—based on the second message—including the second group of devices and excluding the first device.

In another implementation, the key server can receive a message from a device (e.g., a "leader device"), the message specifying a group of devices for which to generate a group symmetric key.

In this implementation, the key server can identify the group of devices based on the message.

In another implementation, the key server can: access a schedule defining groups of devices for a later time period; and, based on the schedule, identify a group of devices scheduled for the later time period.

For example, during a first time period, the key server can: access a schedule defining a first group of devices scheduled for a second time period succeeding the first time period (e.g., the next day); and identify the first group of devices based on the schedule.

Accordingly, the key server can: identify a future group of devices for which to generate a group symmetric key: and pre-generate the group symmetric key and key message. Therefore, the key server can ensure (or reduce latency of) availability of the group symmetric key at a start of runtime execution of the future group of devices.

7.1.1 Device Request to Join/Leave

As described above, the system can include a first device characterized as a leader device representing a group of devices.

In one implementation, in Block S148, a second device can generate a first message representing a request to join a first group of devices including the first device. For example, the second device can generate the first message including a second identifier assigned to the second device. The second device can transmit the first message to the first device in Block S150.

In this implementation, in response to receiving the first message—including the second identifier assigned to the first device—from the second device, the first device can access a policy (e.g., a communication authorization list) defining a set of authorized identifiers (e.g., a set of authorized identifiers for groups of devices represented by the first device) in Block S152. In response to the set of authorized identifiers including the second identifier, the first device can identify a second group of devices including the first device and the second device in Block S154. The first device then can: generate a second message specifying the second group of devices in Block S156; and transmit the second message to the key server in Block S158.

In another implementation, the second device can: generate a second message—including the second identifier assigned to the second device—representing a request to separate from the second group of devices including the second device; and transmit the first message to the first device.

In this implementation, in response to receiving the second message from the second device, the first device can identify a third group of devices including the first device and excluding the second device in Block S154. The first device then can: generate a third message specifying the third group of devices in Block S156; and transmit the third message to the key server in Block S158.

7.2 Key Message Generation

Generally, in Block S118, the key server can generate a key message for a group of devices based on: a set of secret values assigned to the group of devices; a set of prime numbers assigned to the group of devices; and a cryptographic key (e.g., a group symmetric key).

In one implementation, the key server can: access a set of secret values assigned to devices in the group of devices in Block S114; and access a set of prime numbers assigned to devices in the group of devices in Block S116.

For example, the key server can access a set of secret values including: a first secret values $s_1$ assigned to a first device; a second secret values $s_2$ assigned to a second device; and a third secret values $s_3$ assigned to a third device. Additionally, the key server can access a set of prime numbers including: a first prime number $p_1$ assigned to the first device; a second prime number $p_2$ assigned to the second device; and a third prime number $p_3$ assigned to the third device.

In another implementation, in Block S118, the key server can generate a group symmetric key for the group of devices. For example, the key server can generate the group symmetric key K including a random number (e.g., a 128-bit true random number, a 128-bit pseudo-random number) falling below each prime number in the set of prime numbers (i.e., $K<p_1$, $K<p_2$, $K<p_3$).

In one implementation, in Block S126, the key server can generate a key message based on the set of secret values, the set of prime numbers, and the group symmetric key.

More specifically, in Block S120, the key server can calculate a device value corresponding to a product of a secret value—in the set of secret values and assigned to a device in the group of devices—and a prime number in the set of prime numbers and assigned to the device. The key server can repeat this process for each device, in the group of devices, to calculate a set of device values. The server then can: calculate a group value corresponding to a product of the set of device values in Block S122; calculate a message value corresponding to a sum of the group value and the group symmetric key in Block S124; and generate a key message including the message value in Block S126.

For example, for a group of devices including a first device, a second device, and a third device, the key server can calculate a set of device values including: a first device value $v_1$ corresponding to a product of a first secret value $s_1$ assigned to the first device and a first prime number $p_1$ assigned to the first device ($v_1 = s_1 \times p_1$); a second device value $v_2$ corresponding to a product of a second secret value $s_2$ assigned to the second device and a second prime number $p_2$ assigned to the second device ($v_2 = s_2 \times p_2$); and a third device value $v_3$ corresponding to a product of a third secret value $s_3$ assigned to the third device and a third prime number $p_3$ assigned to the third device ($v_3 = s_3 \times p_3$). The key server can then: calculate a group value V corresponding to a product of the set of device values ($V = v_1 \times v_2 \times v_3$); and calculate a message value M corresponding to a sum of the group value V and the group symmetric key ($M = V + K$); and generate a key message including the message value M.

In one implementation, the key server can generate the key message further including a sequence number. For example, the key server can increment a sequence number—as an incremented sequence number—for each new key message generated by the key server, and the key server can include the incremented sequence number in the new key message.

Accordingly, the group of devices can validate a new key message based on a difference between a succeeding sequence number included in the succeeding key message and a preceding sequence number included in a preceding key message. More specifically, a device can detect that a new key message is valid in response to detecting the succeeding sequence number exceeding the preceding sequence number. Therefore, the key server and the group of devices can communicate key messages to group secure group communications while preventing replay attack from unauthorized participants.

Additionally, the key server can generate the key message including a signature. For example, the key server can generate a signature based on: the sequence number; the message value; and a private key of the key server. More specifically, the key server can generate a signature according to an elliptic curve digital signature algorithm based on the sequence number, the message value, and the private key of the key server. The key server can then generate the key message including the sequence number, the message value M, and the signature.

7.3 Group Symmetric Key Validation

In one implementation, for each device in the group of devices, the key server can: calculate a first value corresponding to a product of a secret value assigned to the device and a prime number assigned to the device in Block S128; calculate a second value corresponding to a remainder of the message value divided by the first value in Block S130; and, in response to the second value corresponding to the group symmetric key K, validate the group symmetric key for the device in Block S132.

Therefore, the key server can validate that the group symmetric key is derivable—by each device in the group of devices—from the message value prior to transmitting the key message to the group of devices.

7.4 Key Message Propagation

Block S134 of the method S100 recites transmitting the first message to a device in the first group of devices.

In one implementation, in Block S134, the key server can transmit the key message to a device in the group of devices, such as via the communication network. More specifically, the key server can transmit the key message to the device, in the group of devices, in response to validating the group symmetric key for each device in the group of devices.

In one example, the key server broadcasts the key message to each device in the group of devices.

In another example, the key server transmits the key message to a subset of devices (e.g., a leader device) in the group of devices. In this example, the subset of devices can transmit (e.g., broadcast, relay) the key message to another device—or a remainder of devices—in the group of devices. Therefore, each device, in the group of devices, can receive the key message and group secure communications among the group of devices, even in absence of direct communication with the key server.

8. Group Symmetric Key Extraction

Blocks of the method S100 recite: receiving a first message—including a first value—representing a first cryptographic key for communication among a first group of devices, in the population of devices, including the first device in Block S136; deriving the first cryptographic key from the first message based on the first secret value and the first prime number in Block S144; and associating the first cryptographic key with communication among the first group of devices in Block S146.

Generally, as shown in FIG. 2B, a device—in a group of devices—can: receive a key message representing a group symmetric key; and derive the group symmetric key from the key message based on a secret value and a prime number assigned to the device.

8.1 Key Message Reception

In one implementation, in Block S136, a device—in the group of devices—can receive a key message, such as via the communication network.

In one example, a first device, in the group of devices, receives the key message from a key server via a first communication link—characterized by a first network type (e.g., a LTE communication link)—between the first device and the key server.

In another example, the first device receives the key message from a second device (e.g., a leader device), in the group of devices, via a second communication link—characterized by a second network type (e.g., an ISM communication link) different from the first network type—between the first device and the second device in response to absence of a communication link (e.g., an LTE communication link characterized by the first network type) between the first device and the key server.

7.2 Key Message Validation

Generally, in response to receiving a key message, a device—in the group of devices—can validate and/or authenticate the key message.

In one implementation, in Block S138, the device can validate the key message based on a sequence number included in the key message.

For example, a first device can receive a first message, including a first sequence number, representing a first group symmetric key for communication among a first group of devices. Later, the first device can receive a second message—including a second sequence number—representing a second group symmetric key for communication among a second group of devices. In this example, the first device can validate the second message in response to the second sequence number exceeding the first sequence number.

In another implementation, the device can validate and/or authenticate the key message based on a signature included in the key message. For example, the device can: access a public key of the key server (e.g., pre-provisioned or stored on the device); and verify the signature included in the key message based on the public key of the key server.

7.3 Group Symmetric Key Calculation

Generally, in Block S144, a device—in the group of devices—can derive a group symmetric key based on a secret value and a prime number assigned to the device.

In one implementation, in response to receiving a key message including a message value, the device can: access the secret value and the prime number assigned (e.g., pre-provisioned) to the device; extract the message value from the key message in Block S140; calculate a first value corresponding to a product of the secret value and the prime number in Block S142; and derive the group symmetric key corresponding to a remainder of the message value divided by the first value in Block S144.

For example, a first device, in the group of devices, can derive a group symmetric key K based on a first secret value $s_1$, assigned to the first device, and a first prime number $p_1$ assigned to the first device. More specifically, the first device can derive the group symmetric key K corresponding to a remainder of a message value M divided by a product of the first secret value $s_1$ and the first prime number $p_1$ (K=M mod $(s_1 \times p_1)$).

Similarly, a second device, in the group of devices, can derive the group symmetric key K based on a second secret value $s_s$, assigned to the second device, and a second prime number $p_2$ assigned to the second device. More specifically, the second device can derive the group symmetric key K corresponding to a remainder of a message value M divided by a product of the second secret value $s_2$ and the second prime number $p_2$ (K=M mod $(s_2 \times p_2)$).

Accordingly, each device—in the group of devices—can derive the group symmetric key from the key message (i.e., from the message value included in the key message) based on a secret value and a prime number stored in the device.

However, a third device—excluded from the group of devices—may not be able to derive the group symmetric key (e.g., a first group symmetric key) based on a third secret value and a third prime number assigned to the third device. More specifically, the third device can: extract the message value in response to receiving the key message in Block S140; access the third secret value assigned to the third device; access the third prime number assigned to the third device; calculate a first value corresponding to a product of the third secret value and the third prime number in Block S142; and derive a second group symmetric key corresponding to a remainder of the message value divided by the first value in Block S144, the second group symmetric key different from the first group symmetric key.

Accordingly, by generating the key message based on secret values and prime numbers assigned to devices in the group of devices, the system can securely distribute the group symmetric key to the group of devices. Therefore, the system can prevent other devices—excluded from the group of devices—from deriving the group symmetric key represented in the key message.

In another implementation, in Block S146, a device—in the group of devices—can associate the group symmetric key with secure communication among the group of devices.

In one example, a first device: accesses a set of data representing a state (e.g., a safety state) of a first machine on which the first device is mounted; generates a first message including the set of data; encrypts the first message based on the group symmetric key as an encrypted first message; and transmits the encrypted first message to a second device in the group of devices. More specifically, in response to the set of data representing a fault state of the first machine, the first device generates the first message representing an emergency stop signal.

In this example, the second device: receives the encrypted first message representing the emergency stop signal; decrypts the encrypted first message based on the group symmetric key; generates a signal to place a second machine—on which the second device is mounted—in a safe state (e.g., powered down, fuel disengaged) in response to decrypting the encrypted first message; and transmits the signal to the second machine.

In another example, the first device: receives a second message, including a second set of data, from the second device in the group of devices; decrypts the second message based on the group symmetric key; and processes the second set of data in response to decrypting the second message.

In another implementation, a device (e.g., a leader device)—in the group of devices—can transmit (e.g., broadcast, relay) the key message to at least one device in the group of devices. For example, the device can transmit the key message to another device—or a remainder of devices—in the group of devices. Therefore, each device, in the group of devices, can receive a key message and derive a group symmetric key even in absence of direct communication with a key server.

7.3.1 Group Symmetric Key Validation & Group Authentication

Generally, in response to deriving a group symmetric key from a key message, a first device—in the group of devices—can validate the group symmetric key and/or authenticate a second device in the group of devices.

In one implementation, the first device can: generate a message including a predefined reference value (e.g., a reference value stored in each device in the group of devices); encrypt the message as an encrypted message including an encrypted value; and transmit the message to a second device in the group of devices.

In another implementation, the second device can: receive the encrypted message from the first device in Block S160; decrypt the encrypted message—based on the group symmetric key—as a decrypted message including a decrypted value in Block S162. The second device can validate the group symmetric key in response to the decrypted value corresponding to the predefined reference value in Block S164. Additionally, the second device can authenticate the first device in response to the decrypted value corresponding to the predefined reference value.

Alternatively, in response to a difference between the decrypted value and the predefined reference value (e.g., due to bit error during transmission of the key message and/or the encrypted message), the second device can request the first device to retransmit the encrypted message and/or the key message.

Each device in the group of devices can repeat this process to validate the group symmetric key and to authenticate each other device in the group of devices.

8. Group Re-Keying

Figure 1B:
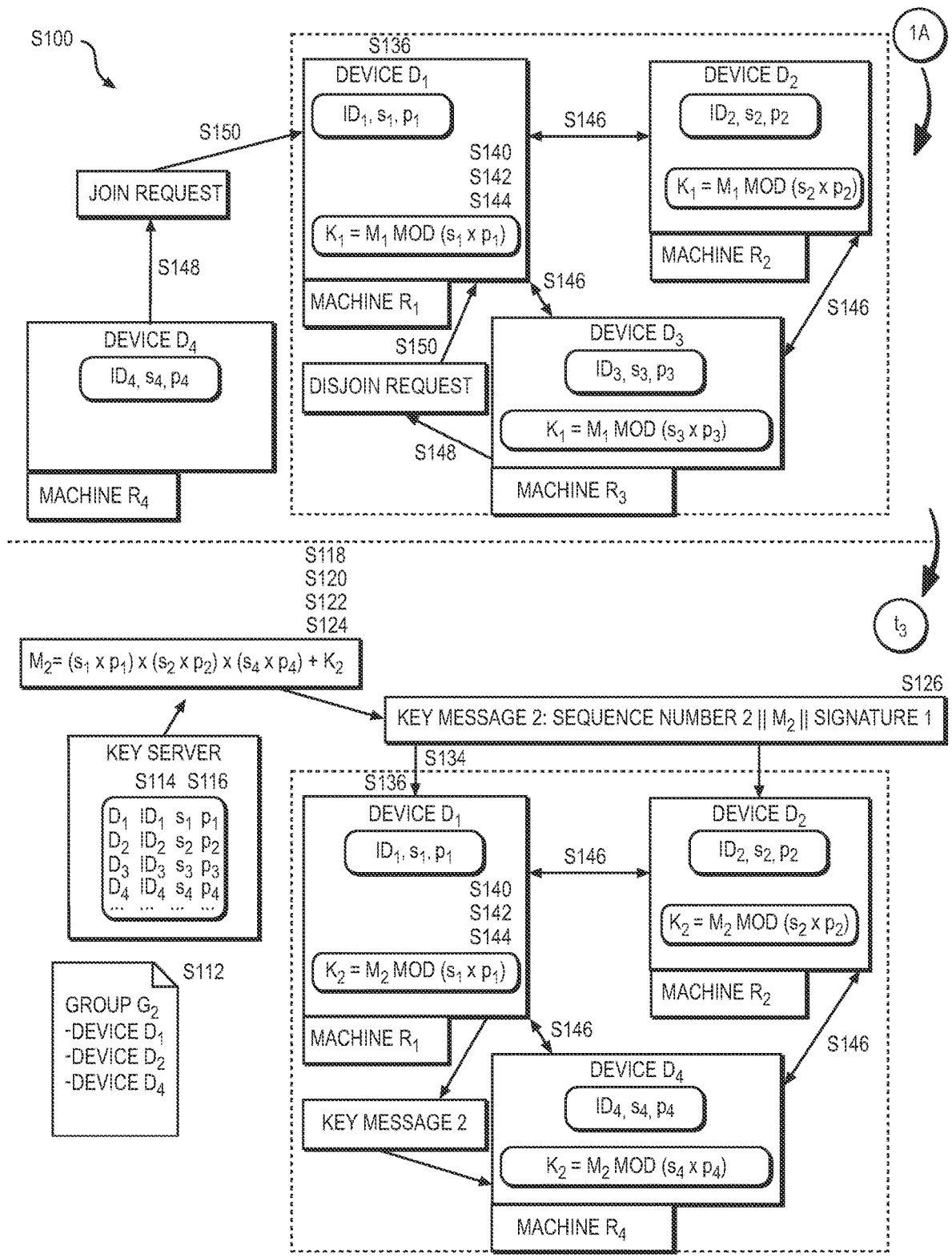

Generally, as shown in FIG. 1B, in response to a change in a group of devices (e.g., an addition of a device into the group of devices, a removal of a device from the group of devices), the key server can execute methods and techniques described above to generate a new group symmetric key and propagate a new key message representing the new group symmetric key.

In one implementation, a key server can identify a second group of devices in the population of devices. For example, the key server can identify the second group of devices based on a message—received from a first device (e.g., a leader device) in a first group of devices excluding a second device—specifying the second group of devices including the first device and the second device.

In this implementation, the key server can: access a second set of secret values assigned to devices in the second group of devices; access a second set of prime numbers assigned to devices in the second group of devices; generate a second group symmetric key for communication among the second group of devices; and generate a second key message based on the second set of secret values, the second set of prime numbers, and the second group symmetric key. Additionally, the key server can generate the second key message including a second sequence number and/or a second signature. The key server can transmit the second key message to a device (e.g., the first device, the second device) in the second group of devices.

In another implementation, each device in the second group of devices can execute methods and techniques described above: to receive the second key message; to extract a second message value from the second key message; to calculate a first value corresponding to a product of a secret value assigned to the device and a prime number assigned to the device; to derive the second group symmetric key corresponding to a remainder of the message value divided by the first value; and to associate the second group symmetric key with communication among the second group of devices.

Accordingly, by generating a new group symmetric key (e.g., the second group symmetric key) in response to identification of the second group of devices, the system can include only authorized devices (i.e., the second group of devices) in secure group communications.

9.1 Re-Keying Example

In one example implementation, the system includes a key server and a population of devices, including a first device $D_1$, a second device $D_2$, a third device $D_3$, and a fourth device $D_4$, each device pre-provisioned (e.g., assigned, stored) with a secret value s and a prime number p during a first time period prior to deployment in an operating field.

More specifically: the first device $D_1$ stores a first secret value $s_1$ assigned to the first device and a first prime number $p_1$ assigned to the first device; the second device $D_2$ stores a second secret value $s_2$ assigned to the second device and a second prime number $p_2$ assigned to the second device; the third device $D_3$ stores a third secret value $s_3$ assigned to the third device and a third prime number $p_3$ assigned to the third device; and the fourth device $D_4$ stores a fourth secret value $s_4$ assigned to the fourth device and a fourth prime number $p_4$ assigned to the fourth device.

The key server stores (e.g., prior to deployment of these devices in the operating field) a population of secret values assigned to devices in the population of devices, including the first secret value $s_1$, the second secret value $s_2$, the third secret value $s_3$, and the fourth secret value $s_4$. Additionally, the key server stores a population of prime numbers assigned to devices in the population of devices, including the first prime number $p_1$, the second prime number $p_2$, the third prime number $p_3$, and the fourth prime number $p_4$.

During a second time period succeeding the first time period (e.g., after deployment of devices into the operating field), the key server identifies a first group of devices for which to generate a first group symmetric key. More specifically, the key server identifies the first group of devices based on a first message—from the first device (e.g., a leader device)—specifying the first group of devices including the first device $D_1$, the second device $D_2$, and the third device $D_3$.

The key server: generates the first group symmetric key $K_1$; generates a first message value $M_1$ corresponding to $M_1=(s_1 \times p_1) \times (s_2 \times p_2) \times (s_3 \times p_3) + K_1$; generates a first key message including the first message value $M_1$; and transmits the first key message to the first device $D_1$ and the second device $D_2$. In this example, the first device $D_1$ relays the first key message to the third device $D_3$.

Each device, in the first group of devices: derives the first group symmetric key $K_1$ from the first key message; and associates the first group symmetric key $K_1$ with communication among the first group of devices. More specifically: the first device $D_1$ derives the first group symmetric key $K_1$ corresponding to $K_1=M_1 \bmod (s_1 \times p_1)$; the second device $D_2$ derives the first group symmetric key $K_1$ corresponding to $K_1=M_1 \bmod (s_2 \times p_2)$; and the third device $D_3$ derives the first group symmetric key $K_1$ corresponding to $K_1=M_1 \bmod (s_3 \times p_3)$.

During a third time period succeeding the second time period, the first device $D_1$: receives a second message from the third device $D_3$ representing a request to separate from the first group of devices (e.g., due to the third device $D_3$ exiting a work zone representing by the first device $D_1$); and receives a third message from the fourth device $D_4$ representing a request to join the first group of devices (e.g., due to the fourth device $D_4$ entering the work zone representing by the first device $D_1$). The first device $D_1$: generates a fourth message specifying a second group of devices including the first device $D_1$, the second device $D_2$, and the fourth device $D_4$; and transmits the fourth message to the key server.

The key server: identifies the second group of devices based on the fourth message; generates a second group symmetric key $K_2$; generates a second message value $M_2$ corresponding to $M_2=(s_1 \times p_1) \times (s_2 \times p_2) \times (s_4 \times p_4) + K_2$; generates a second key message including the first message value $M_2$; and transmits the second key message to the first device $D_1$ and the second device $D_2$. In this example, the first device $D_1$ relays the second key message to the fourth device $D_4$.

Each device, in the second group of devices: derives the second group symmetric key $K_2$ from the second key message; and associates the second group symmetric key $K_2$ with communication among the second group of devices. More specifically: the first device $D_1$ derives the second group symmetric key $K_2$ corresponding to $K_2=M_2 \bmod (s_1 \times p_1)$; the second device $D_2$ derives the second group symmetric key $K_2$ corresponding to $K_2=M_2 \bmod (s_2 \times p_2)$; and the fourth device $D_4$ derives the second group symmetric key $K_2$ corresponding to $K_2=M_2 \bmod (s_4 \times p_4)$.

10. Key Message Generation for Subgroups

In one variation, the key server can identify a group of devices—for which to generate a group symmetric key—by identifying a set of subgroups of devices in the group of devices. For example, the key server can identify a set of subgroups of devices based on a processing capacity and/or memory capacity of each device in a subgroup of devices. More specifically, the key server can identify a subgroup of devices by correlating a size of (or a quantity of devices in) the subgroup of devices with a processing capacity and/or memory capacity of each device in the subgroup of devices (e.g., a device exhibiting greater processing capacity and/or memory capacity can be placed in a subgroup containing a greater quantity of devices).

In this variation, for each subgroup of devices in the set of subgroups of devices, the key server can execute methods and techniques described above: to access a set of secret values assigned to devices in the subgroup of devices; access a set of prime numbers assigned to devices in the subgroup of devices; generate a group symmetric key (e.g., one group symmetric key for all subgroups in the set of subgroups); generate a key message based on the set of secret values, the set of prime numbers, and the group key; and transmit the key message to a device in the subgroup of devices.

For example, the key server can identify a group of devices including the first device $D_1$, the second device $D_2$, the third device $D_3$, and the fourth device $D_4$. Based on a processing capacity and/or memory capacity of these devices, the key server can: identify a first subgroup of devices, in the group of devices, including the first device $D_1$ and the second device $D_2$; and identify a second subgroup of devices, in the group of devices, including the third device $D_3$ and the fourth device $D_4$.

In this example, the key server can: generate a group symmetric key $K_1$; generate a first message value $M_1$ corresponding to $M_1=(s_1 \times p_1) \times (s_2 \times p_2)+K_1$; generate a first key message including the first message value $M_1$; and transmit the first key message to a device in the first subgroup of devices (e.g., the first device $D_1$, the second device $D_2$). Additionally, the key server can: generate a second message value $M_2$ corresponding to $M_2=(s_3 \times p_3) \times (s_4 \times p_4)+K_1$; generate a second key message including the second message value $M_2$; and transmit the second key message to a device in the second subgroup of devices (e.g., the third device $D_3$, the fourth device $D_4$).

Each device, in each subgroup of devices, can then execute methods and techniques described above: to receive the key message; to derive the group symmetric key based on a secret value assigned to the device and a prime number assigned to the device; and to associate the group symmetric key with communication among the group of devices.

For example: the first device $D_1$ derives the group symmetric key $K_1$ corresponding to $K_1=M_1 \bmod(s_1 \times p_1)$; the second device $D_2$ derives the group symmetric key $K_1$ corresponding to $K_1=M_1 \bmod(s_2 \times p_2)$; the third device $D_3$ derives the group symmetric key $K_1$ corresponding to $K_1=M_2 \bmod(s_3 \times p_3)$; and the fourth device $D_4$ derives the second group symmetric key $K_1$ corresponding to $K_1=M_2 \bmod(s_4 \times p_4)$.

Accordingly, by identifying subgroups of devices in a group of devices to group secure communications, the key server and/or devices can reduce a size of key messages, secret values, and/or prime numbers. Therefore, the key server can reduce communication overhead to transmit key messages, and devices can reduce computational overhead to derive group symmetric keys from these key messages.

11. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
during a first time period:
by a first device in a population of devices:
storing a first secret value assigned to the first device; and
storing a first prime number assigned to the first device; and
by a key server:
storing a population of secret values assigned to devices in the population of devices, the population of secret values comprising the first secret value; and
storing a population of prime numbers assigned to devices in the population of devices, the population of prime numbers comprising the first prime number; and
during a second time period succeeding the first time period:
by the key server:
identifying a first group of devices, in the population of devices, comprising the first device;
accessing a first set of secret values, in the population of secret values, assigned to devices in the first group of devices, the first set of secret values comprising the first secret value;
accessing a first set of prime numbers, in the population of prime numbers, assigned to devices in the first group of devices, the first set of prime numbers comprising the first prime number;
generating a first cryptographic key for communication among the first group of devices;
for each device in the first group of devices, calculating a device value, in a set of device values, corresponding to a product of:
a secret value, in the set of secret values, assigned to a respective device in the first group of devices; and
a prime number, in the set of prime numbers, assigned to the respective device in the first group of devices;
calculating a group value corresponding to a product of the set of device values;
calculating a first message value corresponding to a sum of the group value and the first cryptographic key;
generating a first message comprising the first message value; and
transmitting the first message to each device in the first group of devices; and
by the first device:
in response to receiving the first message, extracting the first message value from the first message;

calculating a second value corresponding to a product of the first secret value and the first prime number;

deriving the first cryptographic key corresponding to a remainder of the first message value divided by the second value; and associating the first cryptographic key with communication among the first group of devices.

2. The method of claim 1:

wherein generating the first cryptographic key comprises generating the first cryptographic key comprising a random number less than each prime number in the first set of prime numbers;

wherein calculating the device value for each device in the first group of devices comprises calculating a first device value, in the set of device values, by multiplying the first secret value by the first prime number; and wherein calculating the second value comprises calculating the second value by multiplying the first secret value by the first prime number.

3. The method of claim 2:

wherein storing the population of secret values comprises storing the population of secret values further comprising a second secret value assigned to a second device in the first group of devices;

wherein storing the population of prime numbers comprises storing the population of prime numbers further comprising a second prime number assigned to the second device;

wherein transmitting the first message comprises transmitting the first message to the second device via a first communication link characterized by a first network type; and wherein receiving the first message comprises receiving the first message from the second device via a second communication link characterized by a second network type different from the first network type.

4. The method of claim 1:

further comprising, by the key server during the second time period, for each device in the first group of devices:

calculating a third value corresponding to a product of a secret value assigned to the respective device in the first group of devices and a prime number assigned to the respective device in the first group of devices;

calculating a fourth value corresponding to a remainder of the first message value divided by the third value; and in response to the fourth value corresponding to the first cryptographic key, validating the first cryptographic key for the respective device in the first group of devices; and wherein transmitting the first message comprises transmitting the first message to each device in the first group of devices in response to validating the first cryptographic key for each device in the first group of devices.

5. The method of claim 1:

wherein storing the population of secret values comprises storing the population of secret values further comprising a second secret value assigned to a second device, in the population of devices, excluded from the first group of devices;

wherein storing the population of prime numbers comprises storing the population of prime numbers further comprising a second prime number assigned to the second device;

further comprising, during a third time period succeeding the second time period:

by the first device:

in response to receiving a first identifier assigned to the second device, accessing a policy defining a set of authorized identifiers;

in response to the set of authorized identifiers comprising the first identifier, identifying a second group of devices comprising the first device and the second device;

generating a second message specifying the second group of devices; and transmitting the second message to the key server; and by the key server, in response to receiving the second message from the first device:

identifying the second group of devices based on the second message;

accessing a second set of secret values, in the population of secret values, assigned to devices in the second group of devices, the second set of secret values comprising the first secret value and the second secret value;

accessing a second set of prime numbers, in the population of prime numbers, assigned to devices in the second group of devices, the second set of prime numbers comprising the first prime number and the second prime number;

generating a second cryptographic key for communication among the second group of devices;

generating a third message based on the second set of secret values, the second set of prime numbers, and the second cryptographic key; and transmitting the third message to the first device; and further comprising, by the first device in response to receiving the third message from the key server, transmitting the third message to the second device.

6. The method of claim 1:

further comprising, by the key server during the second time period, identifying a first subgroup of devices, in the first group of devices, based on a processing capacity and a memory capacity of each device in the first subgroup of devices, the first subgroup of devices comprising the first device;

wherein accessing the first set of secret values comprises accessing the first set of secret values assigned to devices in the first subgroup of devices;

wherein accessing the first set of prime numbers comprises accessing the first set of prime numbers assigned to devices in the first subgroup of devices;

wherein transmitting the first message comprises transmitting the first message to a device in the first subgroup of devices; and further comprising, by the key server during the second time period:

identifying a second subgroup of devices, in the first group of devices, based on a processing capacity and a memory capacity of each device in the second subgroup of devices, the second subgroup of devices comprising a second device;

accessing a second set of secret values, in the population of secret values, assigned to devices in the second subgroup of devices, the second set of secret values comprising a second secret value assigned to the second device;

accessing a second set of prime numbers, in the population of prime numbers, assigned to devices in the second subgroup of devices, the second set of prime numbers comprising a second prime number assigned to the second device;

based on the second set of secret values, the second set of prime numbers, and the first cryptographic key, generating a second message representing the first cryptographic key for communication among the first group of devices further comprising the second device; and transmitting the second message to a device in the second subgroup of devices.

7. The method of claim 6, further comprising, during the second time period:

by the second device, in response to receiving the second message:
accessing the second secret value stored in a hardware security module of the second device;
accessing the second prime number stored in the hardware security module of the second device;
deriving the first cryptographic key from the second message based on the second secret value and the second prime number; and
associating the first cryptographic key with communication among the first group of devices.

8. The method of claim 1:

further comprising, by the first device during the first time period, storing a first identifier assigned to the first device;

further comprising, by the first device during a third time period succeeding the first time period and preceding the second time period:
generating a second message:
representing a request to join a second group of devices comprising a second device in the population of devices; and
comprising the first identifier;
transmitting the second message to the second device; and wherein receiving the first message comprises receiving the first message representing the first cryptographic key for communication among the first group of devices comprising the first device and the second device.

9. The method of claim 8, wherein receiving the first message comprises receiving the first message from a key server via the second device based on a second communication link between the first device and the second device in response to absence of a first communication link between the first device and the key server.

10. The method of claim 1, further comprising:

during the first time period, by a second device in the population of devices:
storing a second secret value assigned to the second device and different from the first secret value; and
storing a second prime number assigned to the second device and different from the first prime number; and during the second time period:
by the first device, transmitting the first message to the second device, the first group of devices further comprising the second device; and
by the second device:
receiving the first message from the first device;
extracting the first message value from the first message;
calculating a third value corresponding to a product of the second secret value and the second prime number;

deriving the first cryptographic key corresponding to a remainder of the first message value divided by the third value; and associating the first cryptographic key with communication among the first group of devices.

11. The method of claim 1:

wherein receiving the first message comprises receiving the first message comprising the first message value and a first sequence number; and further comprising, by the first device during a third time period succeeding the second time period:
receiving a second message:
representing a second cryptographic key for communication among a second group of devices, in the population of devices, comprising the first device; and
comprising a third message value and a second sequence number;
validating the second message in response to the second sequence number exceeding the first sequence number;
extracting the third value from the second message;
calculating a fourth value corresponding to a product of the first secret value and the first prime number;
deriving the second cryptographic key corresponding to a remainder of the third value divided by the second value; and
associating the second cryptographic key with communication among the second group of devices.

12. The method of claim 1, further comprising, by the first device:

receiving an encrypted second message, from a second device in the first group of devices, comprising an encrypted value;

decrypting the encrypted second message, based on the first cryptographic key, as a decrypted second message including a decrypted value; and validating the first cryptographic key in response to the decrypted value corresponding to a predefined reference value.

13. The method of claim 1, wherein associating the first cryptographic key with communication among the first group of devices comprises:

accessing a set of data representing a safety state of a first machine on which the first device in mounted;

in response to the set of data representing a fault state of the first machine, generating a second message:
representing an emergency stop signal; and
comprising the set of data;

encrypting the second message based on the first cryptographic key as an encrypted message; and transmitting the encrypted message to a second device in the first group of devices.

14. The method of claim 1:

wherein storing the first secret value comprises storing the first secret value comprising a unique secret value in a population of secret values assigned to devices in the population of devices; and wherein storing the first prime number comprises storing the first prime number comprising a unique prime number in a population of prime numbers assigned to devices in the population of devices, the first prime number exceeding the first secret value.

15. The method of claim 1, further comprising, by the key server:
during the first time period:
storing a population of keying material values corresponding to devices in the population of devices; and
storing a population of prime numbers assigned to devices in the population of devices, the population of prime numbers comprising the first prime number; and
during a third time period succeeding the first time period and preceding the second time period:
identifying the first group of devices based on a schedule defining groups of devices during the second time period;
for each device in the first group of devices:
accessing a keying material value, in the population of keying material values, corresponding to the respective device in the first group of devices; and
based on the keying material value and a predefined function, generating a secret value, in a first set of secret values comprising the first secret value, assigned to the respective device in the first group of devices;
accessing a first set of prime numbers, in the population of prime numbers, assigned to devices in the first group of devices, the first set of prime numbers comprising the first prime number;
generating the first cryptographic key; and
generating the first message based on the first set of secret values, the first set of prime numbers, and the first cryptographic key.

16. A method comprising:
by a key server during a first time period:
storing a population of secret values assigned to devices in a population of devices comprising a first device, the population of secret values comprising a first secret value assigned to the first device; and
storing a population of prime numbers assigned to devices in the population of devices, the population of prime numbers comprising a first prime number assigned to the first device; and
during a second time period succeeding the first time period:
identifying a first group of devices, in the population of devices, comprising the first device;
accessing a first set of secret values, comprising the first secret value, assigned to devices in the first group of devices;
accessing a first set of prime numbers, comprising the first prime number, assigned to devices in the first group of devices;
generating a first cryptographic key for communication among the first group of devices;
for each device in the first group of devices:
calculating a device value, in a set of device values, corresponding to a product of:
a secret value, in the set of secret values, assigned to a respective device in the first group of devices; and
a prime number, in the set of prime numbers, assigned to the respective device in the first group of devices;
calculating a group value corresponding to a product of the set of device values;
calculating a first message value corresponding to a sum of the group value and the first cryptographic key;
generating a first message comprising the first message value; and
transmitting the first message to each device in the first group of devices.

17. The method of claim 16, further comprising, by the first device:
during the first time period:
storing the first secret value assigned to the first device; and
storing the first prime number assigned to the first device; and
during the second time period:
in response to receiving the first message, deriving the first cryptographic key from the first message based on the first secret value and the first prime number; and
associating the first cryptographic key with communication among the first group of devices.

18. The method of claim 17:
wherein storing the population of secret values comprises storing the population of secret values further comprising a second secret value assigned to a second device in the population of devices;
wherein storing the population of prime numbers comprises storing the population of prime numbers further comprising a second prime number assigned to the second device;
wherein identifying the first group of devices comprises identifying the first group of devices comprising the first device and the second device;
further comprising:
by the first device during the second time period:
identifying a second group of devices comprising the first device and excluding the second device in response to receiving a second message, from the second device, representing a request for the second device to separate from the first group of devices;
generating a second message specifying the second group of devices; and
transmitting the second message to the key server; and
by the key server, in response to receiving the second message from the first device:
identifying the second group of devices based on the second message;
accessing a second set of secret values, in the population of secret values, assigned to devices in the second group of devices, the second set of secret values comprising the first secret value and excluding the second secret value;
accessing a second set of prime numbers, in the population of prime numbers, assigned to devices in the second group of devices, the second set of prime numbers comprising the first prime number and excluding the second prime number;
generating a second cryptographic key for communication among the second group of devices;
generating a third message based on the second set of secret values, the second set of prime numbers, and the second cryptographic key; and
transmitting the third message to the first device.

19. The method of claim 16, further comprising, by a second device excluded from the first group of devices:
in response to receiving the first message, extracting the first message value from the first message;

accessing a second secret value assigned to the second device;
accessing a second prime number assigned to the second device;
calculating a second value corresponding to a product of the second secret value and the second prime number; and
deriving a second cryptographic key corresponding to a remainder of the first value divided by the second value, the second cryptographic key different from the first cryptographic key.

20. A method comprising:
   during a first time period:
      by a first device in a population of devices:
         storing a first secret value assigned to the first device;
         storing a first prime number assigned to the first device;
      by a key server:
         storing a population of secret values assigned to devices in the population of devices comprising the first device and a second device, the population of secret values comprising the first secret value and a second secret value assigned to the second device; and
         storing a population of prime numbers assigned to devices in the population of devices, the population of prime numbers comprising the first prime number and a second prime number assigned to the second device; and
   during a second time period succeeding the first time period:
      by the key server:
         identifying a group of devices, in the population of devices, comprising the first device and the second device;
         accessing a set of secret values, comprising the first secret value and the second secret value, assigned to devices in the group of devices;
         accessing a set of prime numbers, comprising the first prime number and the second prime number, assigned to devices in the group of devices;
         generating a cryptographic key for communication among the group of devices;
         for each device in the group of devices, calculating a device value, in a set of device values, corresponding to a product of:
            a secret value, in the set of secret values, assigned to a respective device in the group of devices; and
            a prime number, in the set of prime numbers, assigned to the respective device in the group of devices;
         calculating a group value corresponding to a product of the set of device values;
         calculating a message value corresponding to a sum of the group value and the cryptographic key;
         generating a message comprising the message value; and
         transmitting the message to the second device in the group of devices;
      by the second device:
         in response to receiving the message from the key server, deriving the cryptographic key from the message based on the message value and a product of the second secret value and the second prime number;
         associating the cryptographic key with communication among the group of devices; and
         relaying the message to the first device; and
      by the first device:
         in response to receiving the message from the second device, deriving the cryptographic key from the message based on the message value and a product of the first secret value and the first prime number; and
         associating the cryptographic key with communication among the group of devices.

* * * * *